United States Patent
Schmicker et al.

(10) Patent No.: US 12,000,440 B2
(45) Date of Patent: Jun. 4, 2024

(54) TORSIONALLY ELASTIC SHAFT JOINT AND METHOD OF MAKING THE SAME

(71) Applicant: IFA-Technologies GmbH, Haldensleben (DE)

(72) Inventors: David Schmicker, Magdeburg (DE); Paul Geppert, Zella-Mehlis (DE)

(73) Assignee: IFA-Technologies GmbH, Haldensleben (DE)

( * ) Notice: Subject to any disclaimer, the term of this patent is extended or adjusted under 35 U.S.C. 154(b) by 323 days.

(21) Appl. No.: 17/348,800

(22) Filed: Jun. 16, 2021

(65) Prior Publication Data
US 2021/0396276 A1    Dec. 23, 2021

(30) Foreign Application Priority Data

Jun. 17, 2020   (DE) .......................... 102020116014.3

(51) Int. Cl.
*F16D 3/62*        (2006.01)
*F16D 3/78*        (2006.01)

(52) U.S. Cl.
CPC ................. *F16D 3/62* (2013.01); *F16D 3/78* (2013.01)

(58) Field of Classification Search
CPC ..................................... F16D 3/62; F16D 3/78
USPC ......................................................... 464/93
See application file for complete search history.

(56) References Cited

U.S. PATENT DOCUMENTS

| | | | | |
|---|---|---|---|---|
| 3,393,536 A | * | 7/1968 | Daur | .......................... F16D 3/50 |
| 6,068,555 A | * | 5/2000 | Andra | ........................ F16D 3/76 |
| | | | | 464/93 |

FOREIGN PATENT DOCUMENTS

| | | | | |
|---|---|---|---|---|
| DE | 4020540 C2 | 1/1991 | | |
| DE | 19531190 C1 | 11/1996 | | |
| DE | 102011109887 A1 | 2/2013 | | |
| DE | 102012002660 A1 | 8/2013 | | |
| DE | 102014204224 A1 | 9/2015 | | |
| DE | 102016222897 A1 | 5/2018 | | |
| GB | 278200 | * | 10/1927 | ...................... 464/94 |
| GB | 281126 | * | 12/1927 | ...................... 464/93 |

* cited by examiner

*Primary Examiner* — Greg Binda
(74) *Attorney, Agent, or Firm* — Michael Soderman

(57) ABSTRACT

A torsion-elastic cardan joint for connecting a shaft with a second component that is not continuously coaxial during torque transmission, which comprises a torsion-elastic power transmission system, a flange connected to this in a torque-proof manner, and a second flange connected to this in a torque-proof manner on the opposite end face of the torsion-elastic power transmission system. The shaft-side flange is coaxially connected to the shaft and the second flange is coaxially connected to the second component in a torque-proof manner. The shaft-side flange consists of a dimensionally stable disk-shaped flange part (1, 10, 12). The shaft is directly connected to this disk-shaped flange part (1, 10, 12) in a torque-proof manner, for example, via friction welding. As a result, there is no need to adapt the shaft-side flange to the dimensions of the shaft.

11 Claims, 2 Drawing Sheets

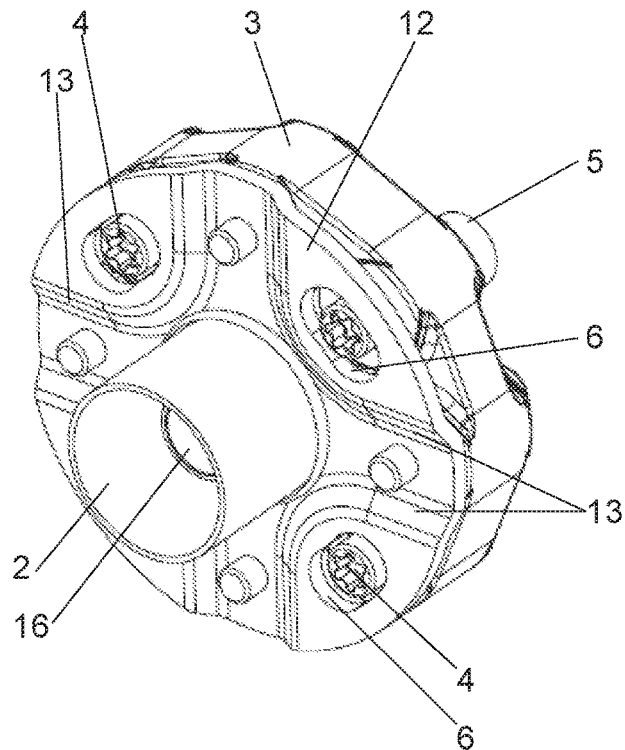
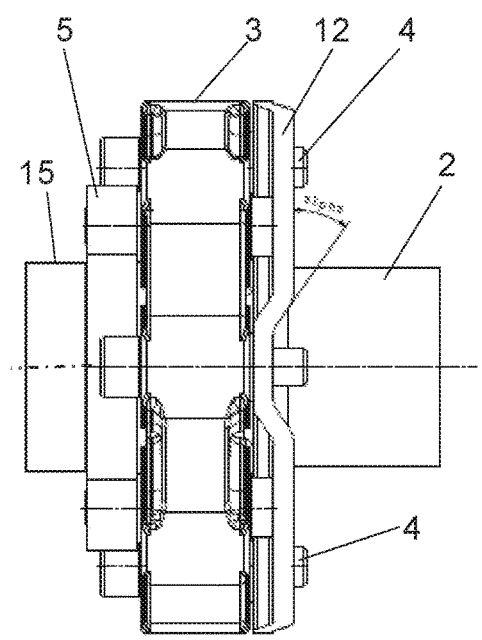
Fig. 5            Fig. 6
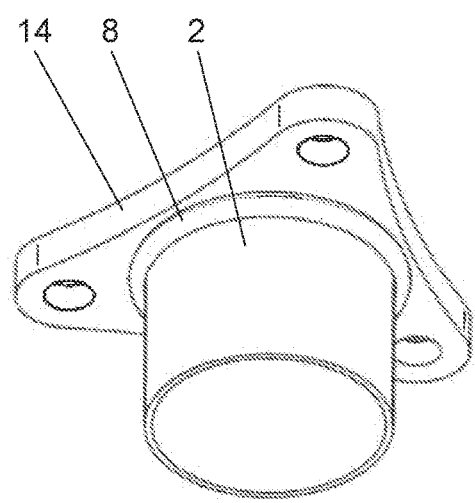
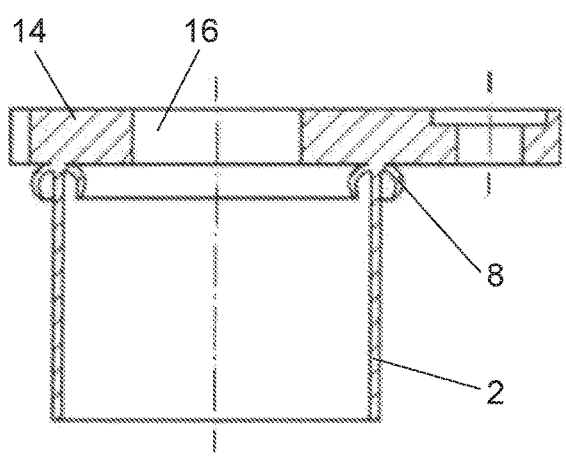
Fig. 7            Fig. 8

TORSIONALLY ELASTIC SHAFT JOINT AND METHOD OF MAKING THE SAME

CROSS REFERENCE TO RELATED APPLICATIONS

This application claims the priority of DE 102020116014.3 filed on 2020 Jun. 17; this application is incorporated by reference herein in its entirety.

BACKGROUND

The invention is based on a torsion-elastic cardan joint with a flange-pipe connection, as well as a method for producing such a cardan joint.

Torsion-elastic cardan joints are sufficiently known and are used, among other things, as a vibration-damping, torsion-elastic connection of an elastic component of the joint, usually a flexible joint disk and a cardan-shaft pipe, in particular, in the drive train of motor vehicles. To connect the cardan-shaft pipe to the flexible joint disk, flanges are used, by means of which the cardan-shaft pipe is usually connected in a torque-proof manner via a weld connection, preferably a friction-weld connection. The flange can be designed as a single-part forging or consist of multiple parts. In the case of a multi-part embodiment, the flange is formed by a primary and a secondary part, wherein the primary part is formed for being fastened, in particular, being welded to the associated shaft pipe and the secondary part is connected to the other flange via a flexible joint disk (DE 195 31 190 C1).

Furthermore, a device for attenuating torsion vibrations of a drive shaft of a motor vehicle is known, as well as a method for its production, where a first shaft is connected to a second shaft in a torque-transmitting manner via a flexible joint disk, being a flexible rag-joint-style disk or the like. The device comprises a flange part, to which the flexible joint disk is attached by means of a plurality of screws evenly distributed along its outer circumference. The free end of the flange part is connected to the first shaft, for example, by means of friction welding or the like (DE 40 20 540 C2).

The flange parts of such flange-pipe connections are usually forged and then mechanically machined components with a tubular welding attachment. At the free end of the tubular welding base, the pipe is coaxially connected to the welding attachment with the flange part by means of friction welding. The welding attachment is compatible with the pipe to be welded to it. The disadvantage of these flange-pipe connections is that, for each pipe attachment, a flange adapted to the pipe with respect to its wall thickness and its outer diameter with a welding attachment corresponding to these dimensions must be provided. This requires a high amount of effort in stocking and providing flange parts. In addition, the production of forged flange parts and their subsequent machining is relatively expensive. Last but not least, such flange parts have a relatively high weight, which is a considerable disadvantage, particularly inn the field of vehicle construction.

SUMMARY

The invention is therefore based on the object aimed at developing a torsion-elastic cardan joint that is flexibly applicable and inexpensive, thereby having a low weight. The method for the production of the torsion-elastic cardan joint is also intended to contribute to the reduction of its manufacturing costs.

DETAILED DESCRIPTION

The torsion-elastic cardan coupling according to the invention is characterized by a new shaft-side flange, meaning arranged on the end face of the torsion-elastic power transmission system facing the shaft. This merely consists of a dimensionally stable, in particular, torsion-resistant disk-shaped component, a so-called flange, without an axial welding attachment for the shaft. The shaft is immediately coaxially connected directly to this disk-shaped flange part in a torque-proof manner. As a result, there is no need to adapt the shaft-side flange to the dimensions of the shaft.

In addition, a disk-shaped flange part is much lighter than a flange produced, for example, by forging with subsequent machining. Such a disk-shaped flange part can be a simple sheet-metal semi-finished product. In this case, this sheet-metal semi-finished product can be formed in all forms and variants typical of flanges, such as star shape, triangular shape or arm flange for example. Its production, for example, as a stamped part, deep-drawn part, or be produced via thermal cutting method, is significantly more cost-effective compared to a forged flange.

To increase the stiffness of the disk-shaped flange part, reinforcing beads can be introduced into the sheet-metal semi-finished product. A particularly high level of stiffness is achieved by forming the cross-sectional profile of the sheet-metal semi-finished product as a U-profile.

In accordance with an additional favorable embodiment of the invention, a coaxial groove can be introduced into the disk-shaped flange part on the shaft side, which forms a centering pipe attachment for a hollow shaft.

In accordance with another favorable embodiment of the invention, the disk-shaped flange part can have a flat coaxial bulge. Such a bulge increases the stiffness of the flange part and simultaneously serves as a receiving surface for the shaft. The bulge can be convex with respect to the arrangement of the shaft, i.e., towards the shaft, or concave, meaning away from the shaft. Depending on this, the shaft is applied to or into the bulge and connected to the flange part in a torque-proof manner. In the case of a convex bulge, this can be flattened to improve the attachment of the shaft in such a way that a flat contact surface is available for the shaft and a flat ring surface is available or a hollow shaft.

As a rule, in their axis of rotation, the components of a torsion-elastic cardan coupling have central drill holes, into which, for example, a centering sleeve protrudes. In accordance with a correspondingly favorable embodiment of the invention, the central drill hole of the disk-shaped flange part has a coaxial sleeve-like deep drawing in the direction of the torsion-elastic power transmission system. Such a deep drawing serves to guide a centering sleeve pressed into the flange.

The method for producing a torsion-elastic cardan coupling entails that the shaft-side flange is manufactured as a disk-shaped flange part, and the shaft is connected directly to this disk-shaped flange part in a torque-proof manner, meaning the shaft is welded to the disk-shaped flange part without a cylindrical intermediate part, for example, a welding attachment. Friction welding is suitable as an advantageous welding method.

According to a favorable embodiment of the method according to the invention, during friction welding post-processing, an undercut is introduced into the disk-shaped flange part in the form of a groove when removing the outer welding bead. This reduces the notch stress influence of the torque-proof connection, and thus increases the strength of the connection.

Further advantages and favorable embodiments of the invention can be found in the following description, the claims and the drawings.

BRIEF DESCRIPTION OF THE DRAWINGS

Preferred exemplary embodiments of the object according to the invention are shown in the drawings and will be explained in detail in the following. The figures show:

FIG. 8: a cross-section of the triangular flange from FIG. 7.

DETAILED DESCRIPTION OF THE PREFERRED EMBODIMENTS

Figure 1:
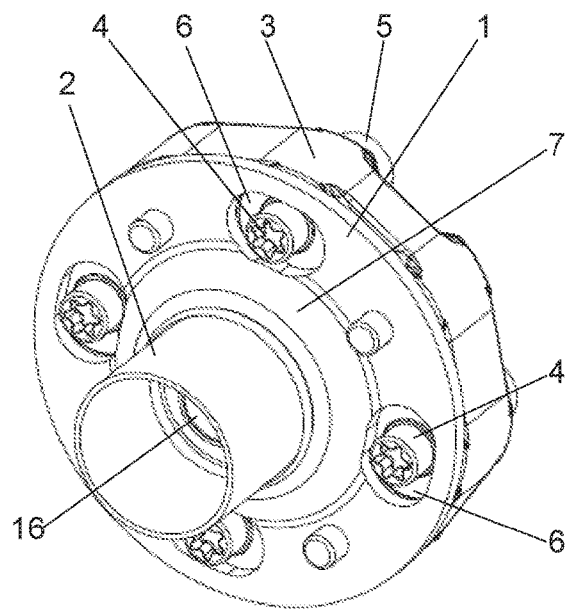
FIG. 1 a spatial representation of a cardan joint according to the invention with a flange part designed as a solid disk, FIG. 2 a cross-section of the flange part with a pipe from FIG. 1, FIG. 3 a spatial representation of a cardan joint according to the invention having a star-shaped flange part with a U-profile, FIG. 4 a cross-section of the cardan joint from FIG. 3, FIG. 5 a spatial representation of a cardan joint according to the invention with a flange part designed as a solid disk with reinforcing beads, FIG. 6 a lateral view of the cardan joint from FIG. 5, FIG. 7 a flat triangular flange with welded pipe piece
Figure 2:
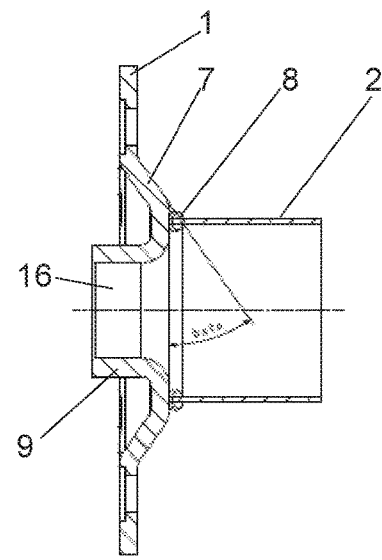

As can be seen from FIG. 1, the cardan joint according to the invention has a disk-shaped flange part formed as a solid disk 1, on which, in the present example, a pipe piece 2 of a shaft is welded on and which is connected to a torsion-elastic power transmission 3, for example a flexible joint disk 3 in a torque-proof manner. The flexible joint disk 3 is connected by screws 4 with a counter-flange 5 in a torque-proof manner. The solid disk 1 is provided to ensure accessibility to the screws 4 and to create a free space for its improved mobility in the area of screws 4 with recesses 6. FIG. 2 shows a cross-section of the solid disk 1 with the welded pipe piece 2. In this exemplary embodiment, the solid disk 1 is provided for increasing its stiffness in the direction of the pipe piece 2 with a coaxial bulge 7, the cone-stump-shaped region of which has an angle, beta, to the plane of the solid disk 1 of $0<\beta<90°$, in the present example 35°. The bulge 7 is flattened on its free end face as a seam preparation and connected to the pipe piece 2 by friction welding. The friction-weld seam is provided with the reference number 8. Furthermore, the solid disk 1 comprises a sleeve-shaped region 9, which is coaxial to its central drill hole 16, to accommodate a centering sleeve (not shown here).

Figure 3:
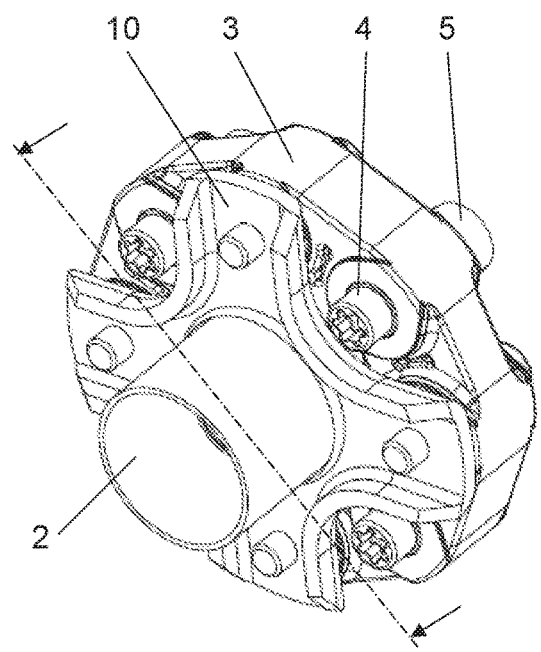
Figure 4:
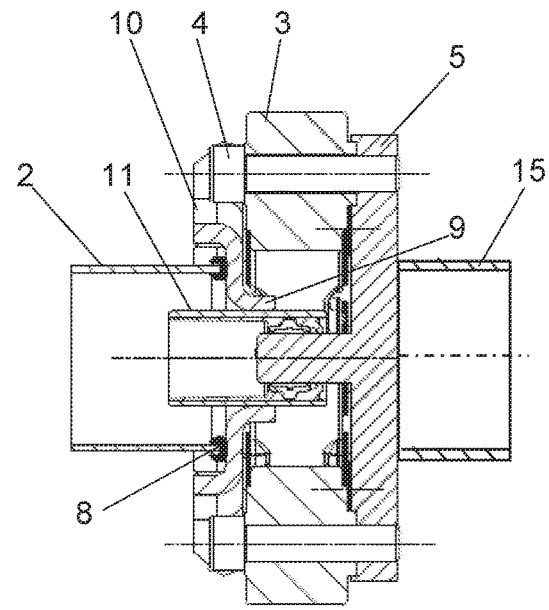

FIG. 3 shows a cardan joint according to the invention, the disk-shaped flange part of which is designed as a star flange 10. To increase its stiffness, it has a U-shaped cross-sectional profile. Parts which resemble those parts of the cardan joint from FIG. 1 were provided with identical reference numbers. As can be seen from FIG. 4, the star flange 10 was also provided in this embodiment for receiving a centering sleeve 11 in the area of its central drill hole 16 with a coaxial sleeve-shaped region 9.

The disk-shaped flange part of the cardan joint shown in FIG. 5 is also formed as a solid disk 12, but comprises beads 13 to increase its stiffness, which run in a cross-shaped manner around the connection point for the pipe piece 2. As can be seen from FIG. 6, the beads 13 have a tapered angle, alpha, to the plane of the solid disk 12 of $0<\alpha<90°$, in the present example, 30°.

At this point, it should be mentioned again that all flange parts with their different reinforcement structures and additional favorable features with regard to weld seam preparation and/or guidance via cost-effective forming methods, deep drawing, punching, among other things, can be produced.

FIG. 7 shows a spatial representation of disk-shaped triangular flange 14 without any reinforcement structures with welded pipe piece 2 and FIG. 8 shows a longitudinal cross-section the connection of the two parts. The friction-weld seam is indicated using reference number 8.

All features shown here may be crucial to the invention, both individually and in any combination with one another.

Additional Items of Note:

A torsion-elastic cardan coupling for connecting a shaft with a second component (shown as reference number 15 in FIGS. 4 and 6 of the drawings) that is not continuously coaxial during torque transmission comprises a torsion-elastic power transmission system (shown as reference number 3 in FIGS. 1, 3, 4, 5 and 6 of the drawings), a shaft-side flange connected to this in a torque-proof manner, and a second flange connected to this in a torque-proof manner on the opposite end face of the torsion-elastic power transmission system.

The shaft-side flange is connected to the shaft, and the second flange is coaxially connected to the second component in a torque-proof manner, and the shaft-side flange is comprised of a disk-shaped semi-finished product.

The shaft-side flange consists of a disk-shaped flange part and the shaft is directly connected to this disk-shaped flange partsemi-finished product in a torque-proof manner, without a connection attachment adapted to the shaft being required to join the shaft to the disk-shaped semi-finished product.

The torsion-elastic cardan coupling according to the 3 paragraphs above is characterized in that the disk-shaped semi-finished product comprises a central drill hole (shown as reference number 16 in FIGS. 1, 2, 5 and 8 of the drawings).

The torsion-elastic cardan coupling according to the paragraphs above, is characterized in that the central drill hole has a coaxial sleeve-like deep draw in the direction of the torsion-elastic power transmission system.

LIST OF REFERENCE NUMERALS

1 Solid disk
2 Pipe piece
3 Torsion-elastic power transmission
4 Screws
5 Counter-flange
6 Recess
7 Bulge
8 Friction-weld seam
9 Sleeve-shaped region
10 Star flange
11 Centering sleeve
12 Solid disk
13 Bead
14 Triangular flange
15 Second component
16 Central drill hole

The invention claimed is:

1. A torsion-elastic cardan coupling for connecting a shaft with a second component that is not continuously coaxial during torque transmission, which comprises a torsion-elastic power transmission system, a shaft-side flange connected to this in a torque-proof manner, and a second flange connected to this in a torque-proof manner on the opposite end face of the torsion-elastic power transmission system, wherein the shaft-side flange is connected to the shaft, the second flange is coaxially connected to the second component in a torque-proof manner, and the shaft-side flange is comprised of a disk-shaped semi-finished product (1, 10, 12),
characterized in that,
the shaft is directly connected to this disk-shaped semi-finished product (1, 10, 12) in a torque-proof manner, without any adaptation for the dimensions of the shaft or any attachment being required to join the shaft to the disk-shaped semi-finished product (1, 10, 12).

2. The torsion-elastic cardan coupling according to claim 1,
characterized in that
the disk-shaped semi-finished product is a star flange (10), a triangle flange or arm flange.

3. The torsion-elastic cardan coupling according to claim 1,
characterized in that
the sheet metal semi-finished product comprises reinforcing beads (13).

4. The torsion-elastic cardan coupling according to claim 1,
characterized in that
the sheet metal semi-finished product has a U-shaped cross-sectional profile.

5. The torsion-elastic cardan coupling according to claim 1,
characterized in that,
in the disk-shaped semi-finished product, a coaxial groove is introduced on the shaft side, in which a pipe piece (2) of a shaft is inserted.

6. The torsion-elastic cardan coupling according to claim 1,
characterized in that
the disk-shaped semi-finished product has a flat coaxial bulge (7), on which the shaft is fixed to rotation or in which the shaft is inserted in a torque-proof manner.

7. The torsion-elastic cardan coupling according to claim 1,
characterized in that
the disk-shaped semi-finished product (1, 10, 12) comprises a central drill hole.

8. The torsion-elastic cardan coupling according to claim 7,
characterized in that
the central drill hole has a coaxial sleeve-like deep draw (9) in the direction of the torsion-elastic power transmission system.

9. The torsion-elastic cardan coupling according to claim 1, wherein the torsion-elastic power transmission (3) is a flexible joint disk.

10. A method for producing a torsion-elastic cardan coupling for connecting a shaft with a second component that is not continuously coaxial during torque transmission, which has a torsion-elastic power transmission system, a shaft-side flange connected to this in a torque-proof manner and a second flange connected to this in a torque-proof manner on the opposite end face of the torsion-elastic power transmission system, wherein the shaft-side flange is connected to the shaft, and the second flange is coaxially connected to the second component in a torque-proof manner, and the shaft-side flange is comprised of a disk-shaped semi-finished product (1, 10, 12),
characterized in that,
the shaft is connected directly to this disk-shaped semi-finished product (1, 10, 12) in a torque-proof manner, without a connection attachment adapted to the shaft being required to join the shaft to the disk-shaped semi-finished product (1, 10, 12).

11. The method according to claim 10,
characterized in that the shaft is connected to the disk-shaped semi-finished product by means of friction welding.

* * * * *